United States Patent Office 3,450,858
Patented June 17, 1969

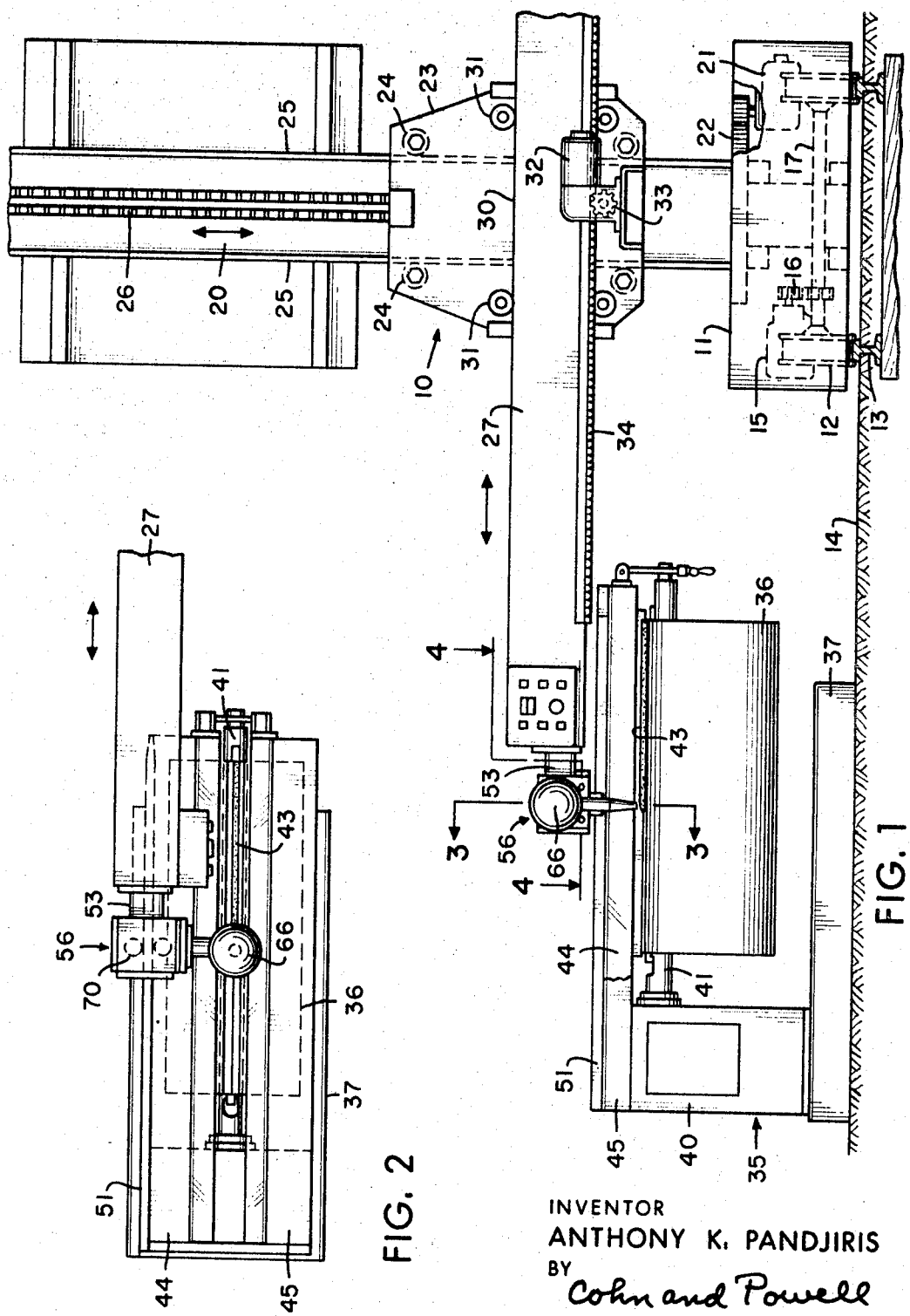

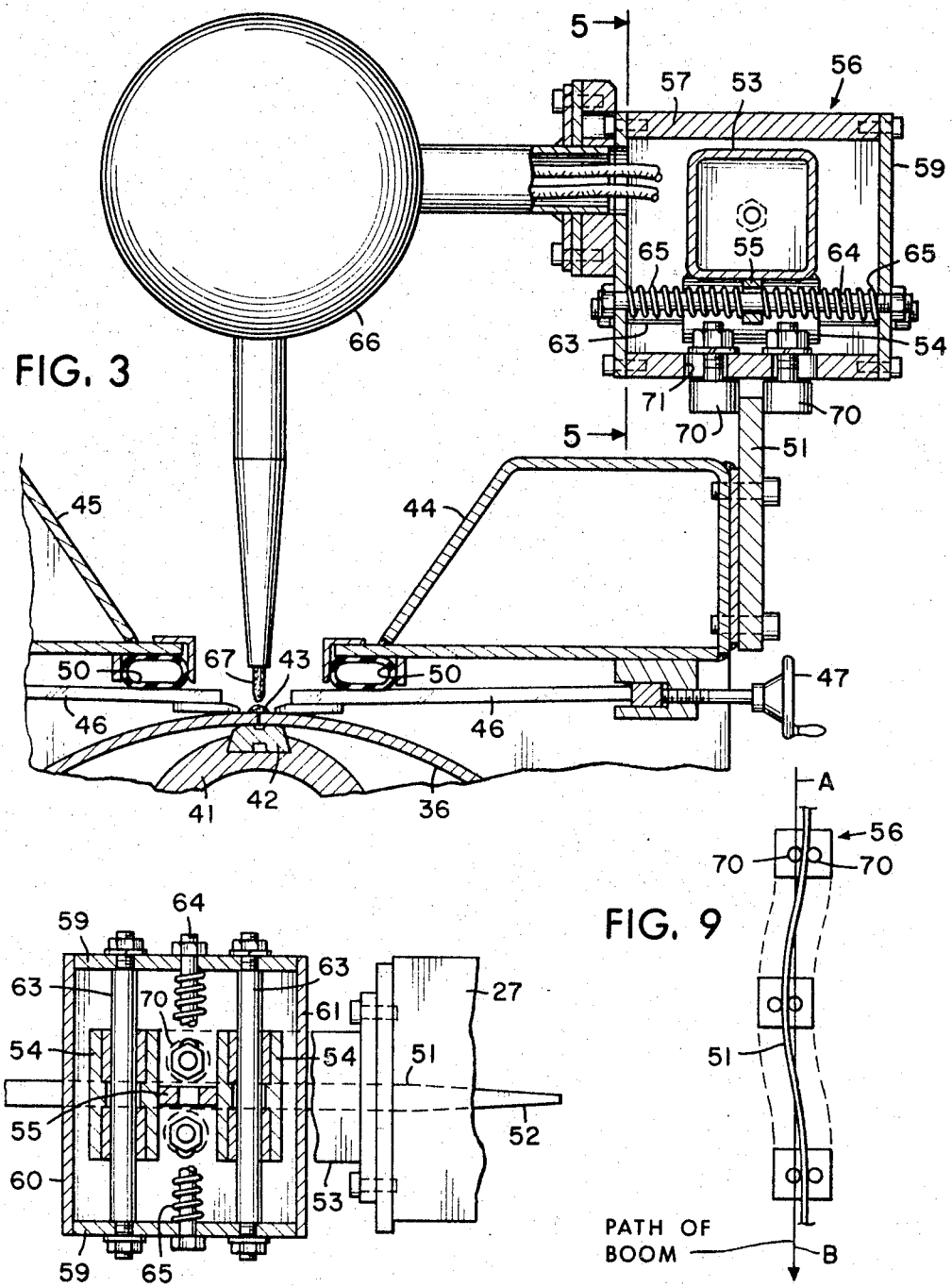

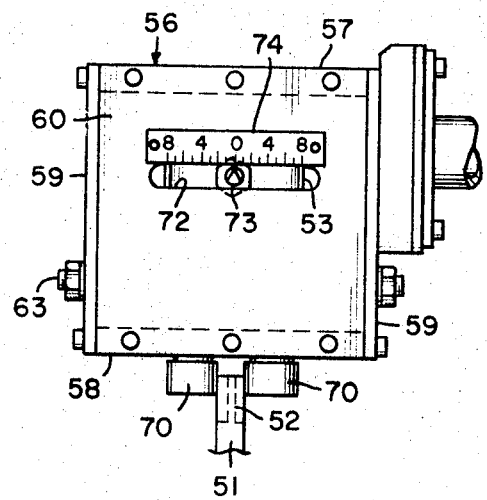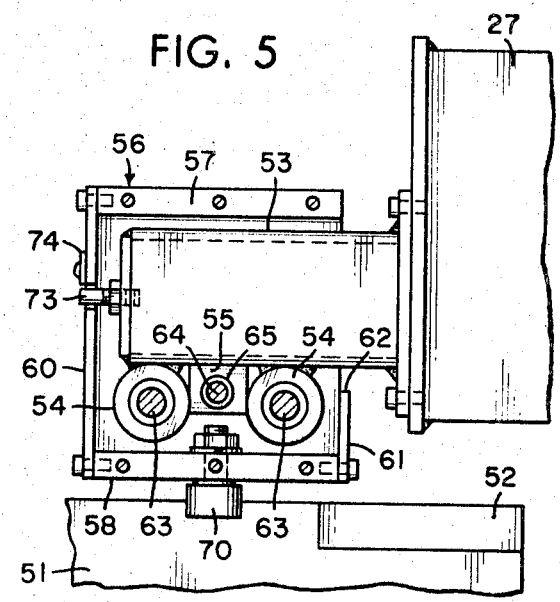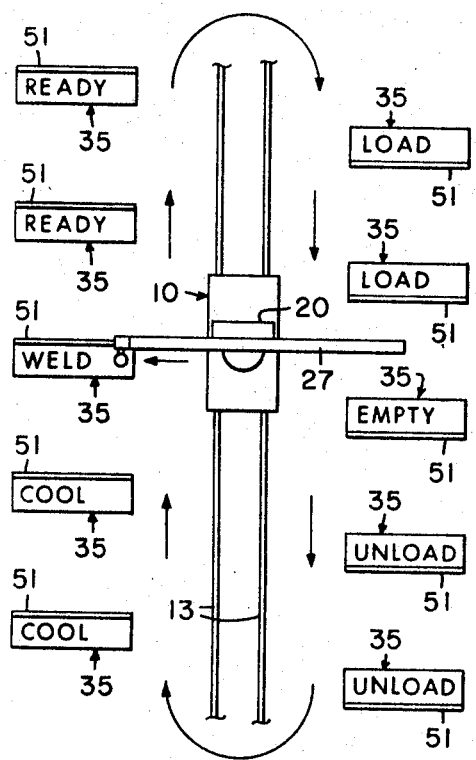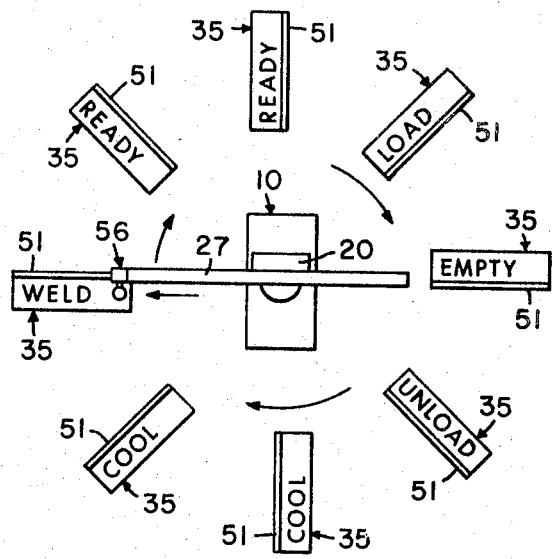

3,450,858
WELDING MECHANISM
Anthony K. Pandjiris, St. Louis, Mo., assignor to The Pandjiris Weldment Co., St. Louis, Mo., a corporation of Missouri
Filed Mar. 16, 1965, Ser. No. 440,325
Int. Cl. B23k 9/12
U.S. Cl. 219—125
12 Claims

ABSTRACT OF THE DISCLOSURE

A welding mechanism in which a welding machine is mounted on the boom of a manipulator, and a follower means interconnects the welding machine with a track means that duplicates an arc path to be followed on a workpiece. The track means is on the workpiece-positioning device spaced from the workpiece. A resilient means operatively interconnects the welding machine and boom and tends to urge the welding machine in one lateral direction or the other to a predetermined position between its range of transverse shifting movement relative to the linear boom path upon lateral displacement from such predetermined position.

In an operating assembly, a plurality of workpiece-positioning devices are located in predetermined positions relative to the manipulator, the manipulator being adjustable to bring the follower means into operative engagement with the track selectively of any one of the workpiece-positioning devices and thereby effect welding operation on the workpiece positioned by such device.

---

This invention relates generally to a welding mechanism, and more particularly to an improved assembly for automatically guiding a welding head along a predetermined arc path upon relative movement of the workpiece and the welding machine.

Heretofore, a seamer of the type adapted to hold and position a workpiece, such as a split tube or abutting plates, incident to welding along the joint, had a track on which a welding machine and carriage was mounted. It is a major objective of the present invention to mount a welding machine on a positioning device, such as on the boom of a manipulator, and to utilize this welding machine selectively with one or more workpiece positioners, such as a seamer, that need not have its own welding machine and carriage. This arrangement materially increases the arc time of the welding machine because, while welding operation is being accomplished on the workpiece retained by one seamer, other seamers can be loaded or unloaded. When welding operation on the workpiece of one seamer is completed, the welding machine can be immediately associated with another seamer for continued operation on another workpiece without any delay for unloading and loading operations.

Other important advantages are realized in that the seamer used in this welding assembly need not include its own heretofore conventional welding machine and carriage, thereby considerably reducing the initial cost of the seamer.

An important object is achieved by the provision of a welding mechanism that includes a device for retaining a workpiece, a track duplicating an arc path to be followed on the workpiece, and a welding machine having a head for effecting a weld, the welding machine being interconnected with the track by a follower so that the head moves along the arc path upon relative movement of the head and workpiece.

Another important object is realized by the provision of means movably mounting the welding machine in order to provide automatic adjustment to maintain the head on the arc path in response to the action of the follower on the track.

Still another important object is attained by the structural arrangement of the component parts movably mounting the welding machine on a support member which enables the machine to shift transversely on the support member relative to the arc path, whereby to maintain the head on the arc path in response to the action of the track follower.

An important object is provided by mounting the welding machine on the boom of a manipulator, the manipulator being of the type having an upstanding column and having the boom reciprocatively mounted on the column. The manipulator is easily adjusted to engage the follower with the appropriate track of an associated workpiece holder.

Another important object is achieved in that the boom of the manipulator is movable in a predetermined linear path generally extending in the direction of yet not necessarily conforming to the arc path for causing relative movement of the welding machine along the workpiece. The welding machine is movably mounted on the boom so as to permit adjustable movement transversely to the linear boom path and to the arc path in order to maintain the welding head on the arc path as determined by the follower action on the preformed track.

Yet another important object is realized in that a seamer is utilized to support and position a workpiece in a manner to define a joint, the seamer including the track that is preformed to duplicate the arc path along the joint to be followed on the workpiece.

An important object is attained by the combination of a manipulator and a seamer of the type mentioned previously which are operatively interconnected to coact in the manner described to afford the desired functional results and advantages.

Another important object is provided by the structural arrangements of the manipulator with a plurality of workpiece-positioning devices, such as seamers, so that a welding machine carried by the boom of the manipulator can be disposed selectively into direct operative association with any one of such devices, with the follower engaging the track of such device, upon adjustment of the manipulator, whereby to increase the arc time of the welding machine.

It is an important objective to provide a welding mechanism and assembly that are simple and durable in construction, economical to manufacture and assemble, highly efficient in opertaion, and which can be utilized with little or no instruction.

The foregoing and numerous other objects and advantages of the invention will more clearly appear from the following detailed description of a preferred embodiment and several assemblies, particularly when considered in connection with the accompanying drawings, in which:

FIG. 1 is a side elevational view of a welding mechanism including a manipulator and a seamer;

FIG. 2 is a top plan view of the seamer shown in FIG. 1;

FIG. 3 is a fragmentary, enlarged cross sectional view of the seamer and welding machine as taken along line 3—3 of FIG. 1;

FIG. 4 is an enlarged fragmentary cross sectional view taken along line 4—4 of FIG. 1;

FIG. 5 is a view, partially in cross section, as taken along line 5—5 of FIG. 3;

FIG. 6 is an end elevational view as seen from the left of FIG. 5;

FIG. 7 is a diagrammatic view of a welding assembly utilizing the manipulator with a plurality of seamers;

FIG. 8 is a diagrammatic view of another welding assembly utilizing a manipulator with a plurality of seamers; and FIG. 9 is a diagrammatic view indicating the relationship of the linear boom path and a possible configuration of a seamer track, together with the resultant action on the welding machine carried by the boom.

Referring now by characters of reference to the drawings, and first to FIG. 1, it is seen that the welding mechanism includes a manipulator generally indicated by 10, having a base 11 mounted by wheels 12 on a pair of tracks 13 embedded in a subjacent floor 14. An electric motor 15 carried by the base 11 is operatively connected by a suitable drive 16 to the interconnecting axle 17 of one pair of wheels 12, the motor 15 serving to transport the manipulator to any position along the tracks 13.

Supported on and carried by the base 11 is an upstanding, substantially vertical column 20. The column 20 is rotatively mounted on the base 11 for movement about its vertical longitudinal axis. An electric motor 21 is connected by a suitable gear drive 22 to the column 20 so as to turn the column 20 selectively to any angular position.

A crosshead 23 is reciprocatively mounted on column 20. The crosshead 23 includes a plurality of rollers 24 engageable with coacting tracks 25 provided on opposite sides of column 20 to guide the crosshead 23 in its reciprocative movement along column 20. A suitable power means (not shown) is connected by chain 26 to the crosshead 23 in order to lift or lower the crosshead 23 to any desired position along the length of column 20.

Reciprocatively mounted on and carried by the crosshead 23 is a substantially horizontal boom 27. Specifically, the boom 27 includes upper and lower longitudinal tracks 30 engageable by a plurality of rollers 31 carried by the crosshead 23. An electric motor 32 carried by the crosshead 23 is connected by a drive pinion 33 to a longitudinal rack 34 carried along the lower margin of boom 27. The motor 32 operated through the pinion and rack connection 33–34 to move the boom 27 in a linear path to any desired extended or retracted position.

A seamer generally indicated by 35 is positioned adjacent the manipulator in a predetermined position and cooperates therewith to provide a welding operation. The seamer 35 is of the type adapted to hold and position a workpiece 36, the joint 43 of the workpiece 36 to be welded being located in a predetermined arc path. In the embodiment disclosed, the seamer 35 is adapted to weld the joint 43 of a split tube constituting the workpiece 36 in order to provide a unitary pipe or cylindrical tube.

The seamer 35 includes a base 37 adapted to seat on the subjacent floor 14 and an upright member 40 at one end of base 37. Extending forwardly from and supported by the upright member 40 is an elongate tubular holder 41, one end of which is free to enable the workpiece 36 to be slipped over and positioned on the holder 41.

As is best seen in FIG. 3, an elongate backup bar 42 is secured lengthwise to the top of the holder 41. The tubular workpiece 36 is located over the holder 41 with its split ends disposed against and on top of the backup bar 42. Accordingly, the joint 43 to be welded, and defined the arc path, is supported and backed up by the bar 42.

A pair of reaction beams 44 and 45 are supported by the upright member 40 and extend forwardly above the workpiece holder 41. As is best seen in FIG. 3, the reaction beams 44–45 are located one on each side of the holder 41 and its associated backup bar 42. A plurality of clamping fingers 46 are mounted to and carried by each reaction beam 44 and 45. These fingers 46 extend substantially the length of the beams 44 and 45 and are adapted to be located closely adjacent to opposite sides of the joint 43. An adjustment means 47 carried by each of the beams 44 and 45 is operatively connected to the respective fingers 46 of such beams in order to place the free ends of such fingers 46 as close as possible to the joint 43.

An expandable hose 50 is located operatively between each of the reaction beams 44 and 45 and its associated fingers 46. Each hose 50 can be inflated by either pneumatic or hydraulic pressure to clamp the associated fingers 46 tightly against the workpiece 36 closely adjacent the joint 43, and hence clamp the joint 43 to be welded tightly against the backup bar 42 of the workpiece holder 41. Thus, the joint 43 and the arc path defined by such joint are stationary and defined. As will appear upon later description of parts, the joint 43 may be straight or may take any curvilinear configuration.

Secured to one of the reaction beams 44 is a plate constituting a guide track 51 having a configuration that conforms to and duplicates the configuration of the joint 43. For example, if the joint 43 is perfectly straight, the track 51 is perfectly straight, but if the joint 43 has some other configuration, such as a curve, the track 51 has a conforming curve. The track 51 is provided with a tapered end 52, the purpose of which will be later explained.

The welding assembly includes a support member 53 attached to the end of the reciprocating boom 27, the support member 53 being of substantially square cross section as is best seen in FIG. 3. Mounted on the lower side of the support member 53 are a pair of transversely disposed cylindrical bearings 54. The axes of the cylindrical bearings 54 extend transversely to the linear boom path. A shoulder 55 attached to the lower side of the support member 53 depends between the cylindrical bearings 54 and is located substantially centrally of the support member.

A welding machine is mounted on and is carried by the reciprocating boom 27. More particularly, the welding machine includes a box-like housing 56 having a top wall 57, a bottom wall 58, opposed side walls 59, a front wall 60 and a rear wall 61. The rear wall 61 is provided with an opening 62 adapted to receive the support member 53 which is located within the housing 56. A pair of slide pins 63 extend across the housing 56 and are secured to the opposed side walls 59, the slide pins 63 being received and mounted in the cylindrical bearings 54 so that the housing 56, and hence the welding machine, is shiftable transversely to the support member 53, and thereby shiftable transversely to the linear boom path.

Another pin 64 is slidably received in an opening of depending flange 55, the opposite ends of the pin 63 being attached to the opposed housing sides 59. A pair of compression springs 65 are carried by the pin 64, one spring 65 being located at each side of the depending housing flange 55. One end of each spring 65 engages the depending flange 55 while the opposite end engages the adjacent housing side wall 59. The opposing spring action tends to hold the welding machine in a predetermined medial position within the range of its transverse movement as determined by the sliding action of slide pins 63 in the cylindrical bearings 54.

The welding machine includes a head 66 having an electrode 67 movable along the arc path defined by the workpiece seam 43 to effect a weld.

Carried by the bottom wall 58 of the welding machine housing 56 are a pair of rollers 70 constituting a follower means engageable with opposite sides of the guide track 51. The stub shafts mounting the rollers 70 are disposed in transversely elongated slots 71 formed in the bottom wall 58 so that the distance between the rollers 70 can be adjusted to accommodate the particular width of the track 51 utilized. It will be understood that as the rollers 70 ride on the track 51, the rollers 70 will urge the welding machine in a direction transverse to the linear boom path in accordance with the configuration of track 51, and hence maintain the welding head 66 including the electrode 67 on the arc path along joint 43.

The front wall 60 of the welding machine housing 56 is provided with an elongate transverse slot 72 through which extends an indicator 73 attached to the end of support member 53, the indicator 73 being associated with a scale 74 to show the position of the welding machine relative to its static position determined by the opposing action of springs 65. As the welding machine shifts laterally with respect to the linear boom path, as permitted by the sliding action of pins 63 within the cylindrical bearings 54 against the action of springs 65, the indicator 73 will move along the scale 74 to show the amount of the transverse deflection caused by the action of the rollers 70 on the guide track 51.

It is thought that the operation and functional advantages of the welding mechanism have become apparent from the foregoing detailed description of parts, but for completeness of disclosure, the usage will be briefly described.

First, the split tube constituting the workpiece 36 is slipped over the workpiece holder 41 of seamer 35. It is conventional practice to locate one edge of the joint 43 over the back-up bar 42 and clamp such edge tightly in place by fingers 46 upon inflation of the associated hose 50. After one edge is clamped tightly in place, the other edge is placed over the backup bar and clamped in place by the cooperating fingers 46 upon inflation of the other hose 50. When the workpiece 36 is secured in place, the weld joint 43 is fixed. It will be assumed that the track 51 on the seamer 35 has a configuration that conforms exactly to the configuration of the joint 43 and hence conforms exactly to the arc path.

The manipualtor 10 is adjusted so as to bring the boom 27 into operative position relative to the seamer 35. Specifically, the linear path of boom 27 is brought into general alignment with the track 51 so that the rollers 70 carried by the welding machine engage opposite sides of the track 51, the tapered track end 52 guiding the rollers 70 onto such track. Upon linear movement of boom 27, the welding machine carried by the boom 27 will move transversely relative to the linear boom path in compliance with the action of rollers 70 as such rollers 70 ride along the guide track 51. Because the configuration of the guide track 51 conforms exactly to the arc path defined by the joint 43, the welding head 66 including the electrode 67 is maintained on the arc path to provide an effective weld seam along such joint.

This shifting action of the welding machine is shown diagrammatically in FIG. 9. It will be assumed that line A–B represents the linear boom path and that the track 51 (FIG. 9) is provided with a definite curve. As the boom 27 moves along its linear, predetermined path A–B, the welding machine carried by and movable with the boom 27 rides along the track 51, the track rollers 70 urging the welding machine transversely relative to the linear boom path.

As explained previously, the compressive action of springs 65 tends to hold the rollers 70 against the opposite sides of the guide track 51 and tends to center the welding machine within its range of transverse movement.

FIG. 7 illustrates one assembly utilizing a welding manipulator 10 with a plurality of coacting seamers 35. For example, the plurality of seamers 35 are disposed in predetermined positions in a circle about the manipulator 10. While the manipulator 10 is being utilized with one of the seamers 35 to effect a welding operation on a workpiece, other seamers are being unloaded or loaded or otherwise conditioned for subsequent use with the manipulator 10 for welding operation. When the workpiece retained by one seamer 35 is welded, the boom 27 is retracted and the column 20 is turned to align the boom 27 with another one of the seamers 35 which has been loaded with a workpiece and is ready for welding operation. The boom 27 is then extended or moved in its linear boom path to engage the rollers 70 of the welding machine carried by the boom 27 with the track 51 of the associated seamer.

Thus it is seen that the arc time of the welding machine is increased because there is no delay incurred between welding operations on different workpieces such as would occur by the use of a single workpiece-positioning device that necessitates the cooling of the workpiece, and the unloading and the reloading of another workpiece. Moreover, because a single welding machine is utilized for all of the welding operations on each of the seamers 35, it is unnecessary to provide seamer of the type having its own carriage and welding machine. Therefore, it is seen that the cost of the seamers utilized in this welding assembly is materially reduced.

Another welding assembly is illustrated in FIG. 8. In this assembly, the manipulator 10 is mounted on tracks 13 and is movable in a predetermined path along such tracks. A plurality of seamers 35 are located on opposite sides of this predetermined path of manipulator 10 in positions so as to be directly associated with the manipulator and the welding machine carried by the manipulator to effect welding operation on workpieces carried by the seamers.

With this particular assembly pattern, the manipulator 10 is moved along the tracks 13 and its vertical column 20 is rotated until the manipulator boom 27 is aligned with the track 51 of one of the seamers 35 on which a workpiece 36 has been positioned. Then, the boom 27 is moved in its linear path and the welding machine carried by the boom performs the welding operation on the workpiece. After the welding operation has been completed, the boom 27 is operatively disengaged from the seamer 35 and retracted; the manipulator 10 is moved along the tracks 13, and the column 20 is rotatively adjusted until the boom 27 is aligned with the track 51 of the next adjacent seamer 35 on the same side of the predetermined manipulator path, such adjacent seamer being loaded with a workpiece and ready for welding operation. After welding operation has been completed in cooperation with the seamers on one side of the predetermined path, the manipulator column 20 is turned to place the welding machine carried by the boom 27 in alignment with the track 51 of one of the seamers 35 at the opposite side of the manipulator path.

Although the invention has been described by making detailed reference to a preferred embodiment of the welding mechanism and several welding assemblies utilizing such mechanism, such detail is to be understood in an instructive, rather than in any restrictive sense, many variants being possible within the scope of the claims hereunto appended.

I claim as my invention:
1. Welding mechanism comprising:
 (a) a device positioning a workpiece,
 (b) track means duplicating an arc path to be followed on the workpiece,
 (c) a welding machine having a head for effecting a weld along the arc path on the workpiece,
 (d) a support member on which the welding machine is mounted,
 (e) follower means interconnecting the welding machine with the track means,
 (f) means effecting relative movement of the support member and the workpiece in a predetermined path not necessarily conforming to the arc path,
 (g) means movably mounting the welding machine on the support member enabling adjustable movement in order to maintain the head on the arc path in response to movement of the follower means on the track means, and
 (h) resilient means operatively interconnecting the welding machine and the support member tending to urge the welding machine in one lateral direction or the other to a predetermined position between its range of transverse shifting movement relative to the support member upon lateral displacement from said predetermined position.
2. Welding mechanism comprising:
 (a) a device positioning a workpiece,
 (b) track means duplicating an arc path to be followed on the workpiece,
 (c) a manipulator including an upstanding column and a boom reciprocatively mounted on the column, the boom being movable in a predetermined linear path generally extending in the direction of yet not necessarily conforming to the arc path,
(d) a welding machine having a head for effecting a weld along the arc path on the workpiece,
(e) follower means interconnecting the welding machine with the track means,
(f) means movably mounting the welding machine on the boom enabling adjustable movement transversely to the linear boom path and to the arc path in order to maintain the head on the arc path in response to movement of the follower means along the track means, and
(g) resilient means operatively interconnecting the welding machine and the boom and tending to urge the welding machine in one lateral direction or the other to a predetermined position between its range of transverse shifting movement relative to the linear boom path upon lateral displacement from said predetermined position.

3. Welding mechanism comprising:
(a) a device positioning a workpiece,
(b) track means duplicating an arc path to be followed on the workpiece,
(c) a manipulator including an upstanding column and and a boom mounted on the column for movement in a predetermined linear path generally extending in the direction of yet not necessarily conforming to the arc path,
(d) a support member mounted on a movable with the boom,
(e) a welding machine including a frame mounted on and carried with the support member, the welding machine having a head for effecting a weld along the arc path on the workpiece,
(f) follower means connecting the frame with the track means,
(g) at least one slide bar mounting the frame to the support member, the slide bar extending tranversely to the arc path in order for the welding machine to to shift relative to the support member to maintain the head on the arc path in response to movement of the following means on the track means, and
(h) resilient means operatively disposed between opposite sides of the support member and the frame, the resilient means tending to urge the welding machine to a predetermined position between its range of tranverse shifting movement relative to the linear boom path.

4. Welding mechanism comprising:
a seamer clamping a workpiece to define a stationary seam,
(b) a track on the seamer duplicating an arc path defined by the seam to be followed on the workpiece,
(c) a manipulator including an upstanding column, a crosshead mounted for movement along the column, and a boom reciprocatively mounted on the crosshead, the boom being movable in a predetermined linear path generally extending in the direction of yet not necessarily conforming to the arc path,
(d) a support member attached to the boom,
(e) a welding machine mounted on and movable with the boom, the welding machine having a head for effecting a weld along the arc path on the workpiece,
(f) follower means interconnecting the welding machine with the track,
(g) at least one slide bar mounting the welding machine to the support member, the slide bar extending tranversely to the arc path in order for the welding machine to shift relative to the linear boom path to maintain the head on the arc path in response to movement of the follower means on the track incident to linear boom movement, and
(h) resilient means operatively interconnecting the welding machine with opposite sides of the support member tending to urge the welding machine in one lateral direction or the other to a predetermined position between its range of transverse shifting movement relative to the linear boom path upon lateral displacement from said predetermined position, and tending to maintain the follower means on the seamer track.

5. Welding mechanism comprising:
(a) a manipulator including an upstanding column, a crosshead reciprocatively mounted on the column, and a boom reciprocatively mounted on the crosshead,
(b) a seamer clamping a workpiece to define a seam,
(c) a track on the seamer duplicating an arc path defined by the seam to be followed on the workpiece,
(d) a welding machine mounted on and movable with the boom, the welding machine having a head for effecting a weld along the arc path on the workpiece, the boom being movable in a predetermined linear path generally extending in the direction of yet not necessarily conforming to the arc path,
(e) rollers on the welding machine engaging opposite sides of the track,
(f) the track having a tapered end to guide the rollers on to the track upon linear movement of the boom,
(g) the boom being generally aligned in the direction of the track to move the rollers and the welding machine along the track when the boom is moved in its linear path, and
(h) means movably mounting the welding machine on the boom enabling adjustable movement transversely to the linear boom path and to the arc path in order to maintain the head on the arc path in response to the action of the rollers on the track.

6. A welding assembly comprising:
(a) a manipulator including an upstanding column, and a boom reciprocatively mounted on the column,
(b) a plurality of devices located in predetermined positions relative to the manipulator, each device being adapted to position a workpiece,
(c) a track duplicating an arc path to be followed on each workpiece,
(d) a welding machine mounted on and movable with the boom, the welding machine having a head for effecting a weld along the arc path on each workpiece,
(e) means effecting relative movement of the head and each associated workpiece,
(f) follower means interconnecting the welding machine with each track so that the head moves along the arc path of the associated workpiece, and
(g) means movably mounting the welding machine on the boom enabling adjustable movement transversely to each arc path in order to maintain the head on the arc path in response to movement of the follower means on the track,
(h) the manipulator being adjustable to bring the follower means into operative engagement with the track selectively of any one of the workpiece-positioning devices and thereby effect welding operation on the workpiece positioned by such device.

7. A welding assembly comprising:
(a) a manipulator including an upstanding column rotatively mounted about a substantially vertical axis, and a boom reciprocatively mounted on the column,
(b) a plurality of devices located around the manipulator in predetermined positions, each device being adapted to position a workpiece,
(c) a track duplicating an arc path to be followed on each workpiece,
(d) a welding machine mounted on and movable with the boom, the welding machine having a head for effecting a weld along the arc path on each workpiece,
(e) means effecting relative movement of the head and each associated workpiece, (f) follower means interconnecting the welding machine with each track so that the head moves along the arc path of the associated workpiece, and (g) means movably mounting the welding machine on the boom enabling adjustable movement transversely to each arc path in order to maintain the head on the arc path in response to movement of the follower means on the track, (h) the column rotating to swing the boom and bring the follower means into operative engagement with the track selectively of any one of the workpiece-positioning devices and thereby effect welding operation on the workpiece positioned by such device.

8. A welding assembly comprising:
(a) a manipulator including an upstanding column, and a boom reciprocatively mounted on the column, the manipulator being movable along a predetermined path,
(b) a plurality of devices located at least along one side of the manipulator path, each device being adapted to position a workpiece,
(c) a track duplicating an arc path to be followed on each workpiece,
(d) a welding machine mounted on and movable with the boom, the welding machine having a head for effecting a weld along the arc path on each workpiece,
(e) means effecting relative movement of the head and each associated workpiece,
(f) follower means interconnecting the welding machine with each track so that the head moves along the arc path of the associated workpiece, and
(g) means movably mounting the welding machine on the boom enabling adjustable movement transversely to each arc path in order to maintain the head on the arc path in response to movement of the follower means on the track,
(h) the manipulator being movable along its predetermined path to bring the follower means into operative engagement with the track selectively of any one of the workpiece-positioning devices and thereby effect welding operation on the workpiece positioned by such device.

9. A welding assembly as defined in claim 8, in which:
(i) the workpiece-positioning devices are disposed along both sides of the predetermined manipulator path,
(j) the manipulator column is rotatively mounted on a substantially vertical axis, and
(k) the column is rotatable to swing the boom and bring the follower means into operative engagement with the track selectively of any one of the workpiece-positioning devices on either side of the manipulator path, and thereby effect welding operation on the workpiece positioned by such device.

10. A welding assembly comprising:
(a) a manipulator including an upstanding column, and a boom reciprocatively mounted on the column,
(b) a plurality of seamers located in predetermined positions relative to the manipulator, each seamer being adapted to position a workpiece to define a stationary seam,
(c) a track on the seamer duplicating an arc path defined by the seam to be followed on the workpiece,
(d) a welding machine mounted on and movable with the boom, the welding machine having a head for effecting a weld along the arc path of the workpiece,
(e) the boom being movable in a predetermined linear path generally extending in the direction of yet not necessarily conforming to the arc path, (f) follower means on the welding machine engageable with the track,
(g) the boom being generally alignable in a direction of the track to move the follower means and the welding machine along the track when the boom is moved in its linear path, and
(h) means movably mounting the welding machine on the boom enabling adjustable movement transversely to the linear boom path and to the arc path in order to maintain the head on the arc path in reponse to the action of the follower means on the track,
(i) the manipulator being adjustable to bring the follower means into substantial alignment and into operative engagement with the track selectively of any one of the seamers and thereby effect welding operation on the workpiece positioned by such seamer.

11. A welding assembly as defined in claim 10, in which:
(j) the manipulator column is rotatively mounted about a substantially vertical axis,
(k) the seamers are located in predetermined positions around the manipulator, and
(l) the column is rotatable about its axis to swing the boom to align the boom substantially with the track of any one of the seamers and to bring the follower means into operative engagement with such track.

12. A welding assembly as defined in claim 10, in which:
(j) the manipulator is movable along a predetermined path,
(k) the seamers are located on both sides of the manipulator path,
(l) the manipulator is movable along its path to bring the boom into general alignment with the track of any one of the seamers located on one side of such path and to bring the follower means into operative engagement with such track,
(m) the manipulator column is rotatively mounted about a substantially vertical axis, and
(n) the column is rotatable to swing the boom and bring the boom generally into alignment with the track of any one of the seamers on the opposite side of the predetermined manipulator path and to bring the follower means into operative engagement with such track.

References Cited
UNITED STATES PATENTS

| | | | |
|---|---|---|---|
| 1,978,042 | 10/1934 | Dodge | 219—125 |
| 1,983,321 | 12/1934 | Stephens et al. | 219—125 |
| 2,068,166 | 1/1937 | Dodge | 219—125 |
| 2,927,992 | 3/1960 | Bateman | 219—125 |
| 2,522,146 | 9/1950 | Tichenor et al. | 219—125 |
| 2,189,399 | 2/1940 | Lewbers | 219—124 |
| 2,670,423 | 2/1954 | Darner et al. | 219—124 |
| 2,839,663 | 6/1958 | McCollom. | |
| 3,072,779 | 1/1963 | Masters et al. | 219—125 |
| 3,125,700 | 3/1964 | Bentley et al. | 219—124 |
| 3,171,012 | 2/1965 | Morehead | 219—124 |
| 3,210,519 | 10/1965 | Kerchoff | 219—125 |
| 3,328,555 | 6/1967 | Dinter | 219—125 |

RICHARD M. WOOD, *Primary Examiner.*

W. DEXTER BROOKS, *Assistant Examiner.*

U.S. Cl. X.R.

219—60